United States Patent [19]

Etheridge

[11] 4,438,383
[45] Mar. 20, 1984

[54] ROCK CRUSHER MOTOR CONTROL CIRCUIT FOR PREVENTING RELAY DROP OUT

[75] Inventor: J. Eugene Etheridge, Richmond, Va.

[73] Assignee: Etheridge Electric, Inc., Richmond, Va.

[21] Appl. No.: 398,947

[22] Filed: Jul. 15, 1982

[51] Int. Cl.³ ............................................. H02P 5/28
[52] U.S. Cl. ................................. 318/799; 361/154; 361/33; 361/92; 318/806
[58] Field of Search .......................... 361/92, 33, 154; 318/798–799, 759, 806

[56] References Cited

U.S. PATENT DOCUMENTS

| | | | |
|---|---|---|---|
| Re. 27,970 | 4/1974 | Johnson . | |
| 2,410,183 | 10/1946 | Ray | 361/154 |
| 3,105,919 | 10/1963 | Werts | 361/33 X |
| 3,167,686 | 1/1965 | Riebs . | |
| 3,380,674 | 4/1968 | Bruns . | |
| 3,422,279 | 1/1969 | Rowell . | |
| 3,452,938 | 7/1969 | Michaelson . | |
| 3,577,040 | 9/1968 | Campbell | 361/154 |
| 3,689,806 | 9/1972 | Saita . | |
| 3,700,914 | 10/1972 | Granieri et al. . | |
| 3,721,832 | 3/1973 | Lee . | |
| 3,774,109 | 11/1973 | Janycky | 361/92 X |
| 3,894,698 | 7/1975 | Falk . | |
| 4,097,791 | 6/1978 | Bivens et al. . | |
| 4,150,303 | 4/1979 | Armstrong . | |
| 4,183,071 | 1/1980 | Russell | 361/92 X |
| 4,197,444 | 4/1980 | Pritchett . | |
| 4,204,128 | 5/1980 | Kruper . | |
| 4,328,522 | 5/1982 | Tryan | 361/33 |

OTHER PUBLICATIONS

Cutler–Hammer Technical Information Publication No. A400J, "A–C Reduced Voltage Three Phase Autotransformer Starter Size 6" (Nov. 1, 1974).

*Primary Examiner*—J. V. Truhe
*Assistant Examiner*—Patrick Keane
*Attorney, Agent, or Firm*—Kerkam, Stowell, Kondracki & Clarke

[57] ABSTRACT

Electric motor starter circuits for operating motors which cannot be restarted under load, but which maintain sufficient momentum during merely momentary interruptions of AC power to continue normal operation upon power restoration. Conventional motor starter circuits drop the motor off line, even in the event of momentary interruptions. The starters disclosed herein prevent unintended and unnecessary equipment down time as a result of AC motor starters dropping out during mere momentary power interruptions through the provision of a delayed drop out circuit including a DC voltage storage capacitor connected to the coil of the motor starter relay subsequent to the initiation of normal AC energization. In one embodiment, actual motor rotation is sensed to determine when to allow the motor starter relay to drop out.

12 Claims, 5 Drawing Figures

ROCK CRUSHER MOTOR CONTROL CIRCUIT FOR PREVENTING RELAY DROP OUT

BACKGROUND OF THE INVENTION

The present invention relates to electric motor starter circuits for operating motors which cannot be restarted under load, such as motors for operating rock crushers.

Large AC electric motors are typically energized through a heavy duty electromagnetic control relay commonly known as a motor starter. Often, momentary pushbutton Start and Stop control is provided. In a typical pushbutton Start switch arrangement, the actuating coil of the power relay is initially energized through normally-open contacts of the momentary pushbutton Start switch. Thereafter, in what is commonly know as latch-on or holding circuit arrangement, normally-open auxiliary contacts of the power relay or other control relay bypass the Start switch contacts to maintain energization to the start relay coil so long as AC supply voltage is available. The Stop switch is a momentary pushbutton switch having normally-closed contacts connected in series with the power relay coil so that the holding circuit is broken when the Stop switch is actuated. When this occurs, the power relay drops out, dropping the motor off line.

It will be apparent that such a magnetic motor starter is susceptible to unintended drop out upon the occurrence of momentary interruptions in the AC power supply as sometimes occur as a result of such events as lightening strikes momentarily tripping circuit breakers, utility company switching operations, or the like. Even a momentary drop out of the control relay causes the holding circuit to be broken. For many AC motor operated loads this poses only a minor inconvenience, as the Start switch may simply again be actuated so as to resume operation.

However, there are other electic motor and load combinations which cannot be restarted under load, and significant equipment down time may be required to prepare the motor and load for restarting. One example of such a load with which the present invention is particularly concerned is a rock crusher wherein rocks are fed between a pair of confronting jaws which reciprocate relative to each other. A typical rotary-to-reciprocal motion transmission arrangement for a rock crusher deliberately has a fairly large inertial mass, for example in the form of a flywheel, which stores energy during each return stroke of the jaws such that, during the forward or crushing stroke of the jaws, additional force in excess of that which could be provided by the motor alone is available. In normal operation, a rock crusher is started without any rocks between the jaws, and rocks are not fed until such time as the rock crusher attains operating speed and momentum has accordingly built up in the inertial mass. Similarly, when it is desired to turn off the equipment, the supply of rocks to be crushed is terminated, and the rock crusher is turned off only after the jaws are cleared.

However, during momentary power outages as described above which cause a magnetic motor starter to drop out removing the motor from the line, the rock crusher is sometimes unnecessarily stopped because the motor drops off line while the rock crusher still has sufficient momentum to continue operation upon resumption of the power supply. Once unintentionally stopped in this manner, the rock crusher cannot be restarted until the jaws are cleared, resulting in an unacceptable down time and the loss of production.

By the present invention, there is provided a circuit arrangement for preventing motor starter relay drop out during momentary interruptions of the main AC power source, during which interruptions the rock crusher maintains sufficient momentum to resume normal operation upon restoration of the main AC power supply. It should be noted, however, upon the occurrance of longer term power failures there is no choice but to clear the rocks between the jaws before resuming opration. Upon the occurrance of such longer-term power interruptions, the circuit arrangement of the present invention allows the motor starter relay to drop out.

SUMMARY OF THE INVENTION

Accordingly, it is an object of the invention to provide a means for preventing equipment down time as a result of momentary power loss.

It is another object of the invention to provide a circuit arrangement which is fully compatible with existing motor starter circuits such that the circuit of the present invention may be readily retrofitted in the field or incorporated in the manufacture of new equipment with minimal modification to off-the-shelf motor starters.

Briefly stated, and in accordance with an overall concept of the invention, it is recognized that unintended and unnecessary equipment down time as a result of AC motor starters dropping out during mere momentary power interruptions can be prevented through the provision of a delayed drop out circuit including a DC voltage storage capacitor connected to the coil of the motor starter relay subsequent to the initiation of normal AC energization.

Briefly stated, and in accordance with a more particular concept of the invention, the circuitry for supplying power to the actuating coil of an appropriate relay or relays in the motor starter control is modified compared to standard circuits. Specifically, auxiliary contacts are added such that normal AC energization is initially applied to the actuating coil or coils, but the circuit is subsequently switched such that the actuating coil is supplied from a DC power supply powered from the same AC line and having an output storage capacitor. During momentary AC power interruptions, charge stored in the capacitor keeps the actuating coil energized sufficiently long to prevent relay drop out during such momentary power interruption. Thus the motor remains on line for immediate resumption of operation upon restoration of power. It will be appreciated that the precise component values and time constants are selected in view of the particular equipment involved so as to prevent down time in the event of acceptably-short momentary power interruptions, and yet to ensure that the starter relay does drop out upon ocurrance of lengthier power interruptions after which insufficient momentum would remain to resume normal operation.

Briefly, and in accordance with a more particular aspect of the invention, a rock crusher motor control circuit comprises a magnetic motor starter relay including an actuating coil and a set of normally-open main contacts connected for energizing the motor from the main power source. A starting circuit is provided for initially energizing the actuating coil from the main power source. Additionally provided are a storage capacitor and a DC power supply connected for charging the storage capacitor and maintaining the charge when the main power source is available. An auxiliary contact arrangement is operable following initial energization of the actuating coil to disconnect the actuating coil from the main power source and to connect the actuating coil for energization from the storage capacitor and the DC power supply such that, upon subsequent momentary interruption of the main power source, energy stored in the capacitor maintains the actuating coil of the motor starter relay energized until restoration of main power source.

Typically, the magnetic motor starter relay includes a movable armature pulled by magnetic force produced by the actuating coil in a stroke from an unenergized to an energized position for actuating the relay contacts. The auxiliary contact arrangement preferably is included as a part of the magnetic motor starter relay itself and operates to disconnect the actuating coil at an intermediate point of the actuating stroke, whereupon momentum of the armature carries the armature through another intermediate point of the actuating stroke at which the auxiliary contact arrangement connects the actuating coil for energization from the storage capacitor and the DC power supply.

With some motor starters, particularly in the smaller sizes, a DC voltage which is well-sufficient for holding the starter relay actuated once actuated is insufficient for ensuring reliable pull in the relay in the first place. For such cases, in accordance with another aspect of the invention, a dual-voltage DC supply arrangement is provided. The dual-voltage DC supply is arranged to initially provide a relatively higher voltage to ensure sufficient magnetic force to carry the armature from the other intermediate point of the actuating stroke to the energized position and, subsequent to full actuation of the motor starter relay, to provide a relatively lower voltage at least sufficient to hold the armature in the energized position. In one suitable dual-voltage circuit, the relatively higher voltage portion of the DC supply comprises a charged capacitor which provides only a momentary pulse even when AC line power is present. Isolation diodes are included to prevent interaction between the relatively higher and the relatively lower voltage portions of the DC supply.

As mentioned above, one of the objects of the invention is to provide a circuit compatible with off-the-shelf motor starters. One particular type of motor starter is known as a reduced voltage motor starter. Such a starter, by means of an autotransformer, provides an initial lower AC voltage to start the motor, thereby avoiding unduly large inrush or surge currents until motor rotation develops sufficient counter electromagnetic force.

In connection with such reduced voltage starters, in accordance with another aspect of the invention a drop out preventing circuit is provided in combination with a reduced voltage motor starter operable from an AC power source and of the type which includes a transformer for reducing voltage applied to the motor during starting. The starter has a number of relays, one of which is a control relay having an actuating coil energized from the AC power source through a momentary start switch, having latch-on contacts bypassing the start switch to maintain the control relay actuating coil in an energized condition during normal operation, and having a set of normally-open control contacts. Such a starter also includes a start sequencing relay arrangement energized from the AC power source through the control contacts. Such a starter also includes a start sequencing relay arrangement energized from the AC power source through the control contacts. The start sequencing relay arrangement includes a start relay energized initially and having contacts arranged to momentarily condition the transformer for supplying reduced voltage to the motor, a main relay having an actuating coil energized next and having contacts arranged for connecting the transformer to the AC power source, and a run relay having an actuating coil energized finally and having contacts arranged for connecting the motor directly to the AC power source through the main relay contacts after the start relay is no longer energized.

In accordance with the invention, in combination with the foregoing there is provided a storage capacitor and a DC power supply connected for charging the storage capacitor and maintaining the charge when the AC power source is available. Additionally, there are a main relay auxiliary contact arrangement operable following initial energization of the main relay to disconnect the main relay actuating coil from the AC power source and to connect the main relay actuating coil for energization from the storage capacitor and the DC power supply, and a run relay auxiliary contact arrangement operable following initial energization of the run relay to disconnect the run relay actuating coil from the AC power source and to connect the run relay actuating coil for energization from the storage capacitor and the DC power supply. As a result, upon subsequent momentary interruption of the AC power source, energy stored in the capacitor maintains the actuating coils of the main relay and the run relay energized until restoration of the AC power source.

Depending upon the details of the specific motor starter, in order to immediately reenergize the control relay actuating coil upon restoration of the AC power source following momentary interruption without requiring operation of the momentary start switch, there is provided a further auxiliary contact connected to bypass the start switch when the run relay is energized.

Briefly stated, and in accordance with another overall concept of the invention, it is recognized that, under some circumstances, more reliable operation is obtained where actual motor rotation is sensed and employed to determine when to allow the starter relay to drop out, rather than merely relying on a predetermined RC time constant. In this form of the invention, means are included, operable at least upon interruption of the main power source, for sensing motor rotational velocity. Additionally, a controlled switching element is connected to the storage capacitor and to the relay actuating coil, and is controlled by the velocity sensing means to de-energize the actuating coil when motor rotational velocity decreases below a predetermined velocity. The predetermined velocity is selected such that above this velocity the motor and load can be expected to have sufficient momentum to resume normal operation upon restoration following momentary power interruption, and, below which, insufficient momentum likely remains. It will be appreciated that a sufficient safety factor is built into this determination to ensure reliable operation.

In one form, the velocity sensing means comprises a full-wave rectifier connected to the motor terminals for rectifying induced voltage generated by the motor when it is rotating without power supplied. Under these conditions, as is known, an AC motor operates as a generator, producing a voltage whose amplitude and frequency is dependent upon the motor rotational velocity. In accordance with the invention, this voltage is employed to hold in the motor contacts and the contacts open when this induced voltage drops below a predetermined voltage threshold. Advantageously, a transistor switch is connected between the storage capacitor and the actuating coil. The transistor switch is controlled by the rectified induced voltage from the motor, and de-energizes the relay operating coil when induced voltaged drops below the predetermined threshold.

In the specific implementation of this concept, in accordance with the invention a number of problems are recognized and effectively dealt with. For example, in a 480 volt three-phase system, the sensing rectifier output voltage is as high as 700 volts peak-to-peak. However, only approximately three volts DC is required to bias a bipolar transistor into conduction. While dropping resistors might be employed to drop the voltage to the proper level, such a simple approach would be unsatisfactory when the voltage started dropping because the switching transistor would cut off too soon.

In order to overcome this problem, a voltage threshold conduction device, for example, a Zener diode or a string of forward-biased silicon diodes, and a resistance are connected in series between the full-wave rectifier output terminals. The voltage threshold conduction device thus operates as a voltage regulator, maintaining, for example, three volts thereacross over a wide range of input voltages, for example, from 7 to 700 volts. However, even for this approach to be effective, in accordance with the invention it is recognized that only negligible current may be drawn from the series circuit in order to avoid loading the voltage across the voltage threshold conduction device. Accordingly, a solid state switching device is employed having a relatively high input impedance. For example, the solid state switching device comprises a MOSFET input element connected to a bipolar transistor output element.

While the brief summary of the invention, above, and the detailed description, below, describe embodiments wherein the switching of the starter relay coil from AC to DC energization occurs during the actual operating stroke of the starter relay and is done by means of auxiliary contacts on this same relay, it will be appreciated that the concepts of the invention may be implemented in a variety of ways. For example, a completely separate relay may be employed to perform the AC to DC switching. As another example, the AC to DC switching can occur slightly later in time, following full actuation of the starter relay.

BRIEF DESCRIPTION OF THE DRAWINGS

While the novel features are set forth with particularity in the appended claims, the invention, both as to organization and content, will be better understood and appreciated, along with other objects and features thereof, from the following detailed description, taken in conjunction with the drawings, in which:

DETAILED DESCRIPTION OF THE PREFERRED EMBODIMENTS

Figure 1:
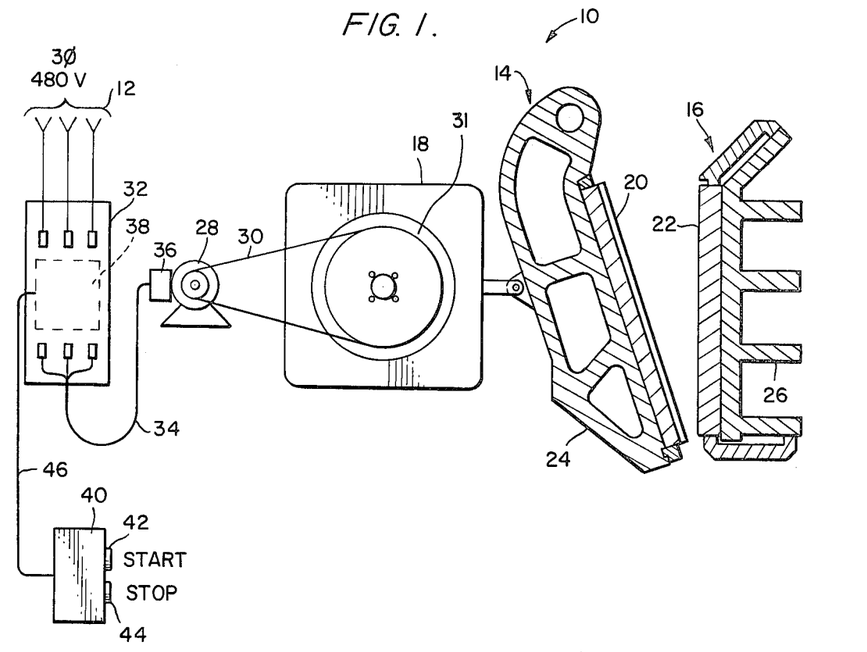
FIG. 1 is a schematic representation of the mechanical arrangement of a rock crusher.

With reference now to FIG. 1, a representative rock crusher 10 is supplied from a commercial power source 12, for example, providing three phase AC power at 480 volts. As is conventional, the rock crusher 10 includes a movable jaw 14 which is reciprocated back and forth relative to a confronting fixed jaw 16 by means of a transmission 18 of any suitable type. The jaws 14 and 16 have respective replaceable crushing plates 20 and 22 respectively supported by a movable crushing jaw body 24 and a fixed main stand 26.

The transmission 18, and thus the movable jaw 14, is driven by a three-phase 480 volt electric motor 28 via a drive belt 30. While in no way intended to limit the scope of the present invention, a typical motor 28 for a rock crusher is rated at 200 horsepower. As described briefly hereinabove, the transmission 18 converts rotary to reciprocating motion by means of a conventional mechanical linkage such as an eccentric or crankshaft arrangement. Significantly, the transmission 18 includes at least one inertial mass element such as a flywheel 31 for energy storage to increase the crushing force between the jaws 14 and 16 beyond that which could be instantaneously supplied by the motor 28 alone.

In operation, large rocks are deposited, such as by means of a conveyor (not shown) from the top between the jaws 14 and 16. The relative reciprocating action of the jaws 14 and 16 crushes the rocks between the plates 20 and 22, and crushed rock emerges below the jaws 14 and 16.

For controlling energization of the motor 28 from the AC power source 12, a motor starter 32 is provided, electrically interposed between the power source 12 and the motor 28. A three-wire cable 34 connects a terminal box 36 of the motor 28 to the starter 32. It will be understood that a motor starter 32 comprises one or more power relays in a circuit represented by the dash line rectangle 38, suitable examples of which are described hereinafter with reference to FIGS. 2-4. For providing operator control over the operation of the rock crusher 10, a remote Start/Stop control station 40 including momentary Start 42 and Stop 44 momentary pushbutton switches is connected via a representative line 46 to the circuitry 38. A typical motor starter 32 accommodates a number of remote control stations 40.

Figure 2:
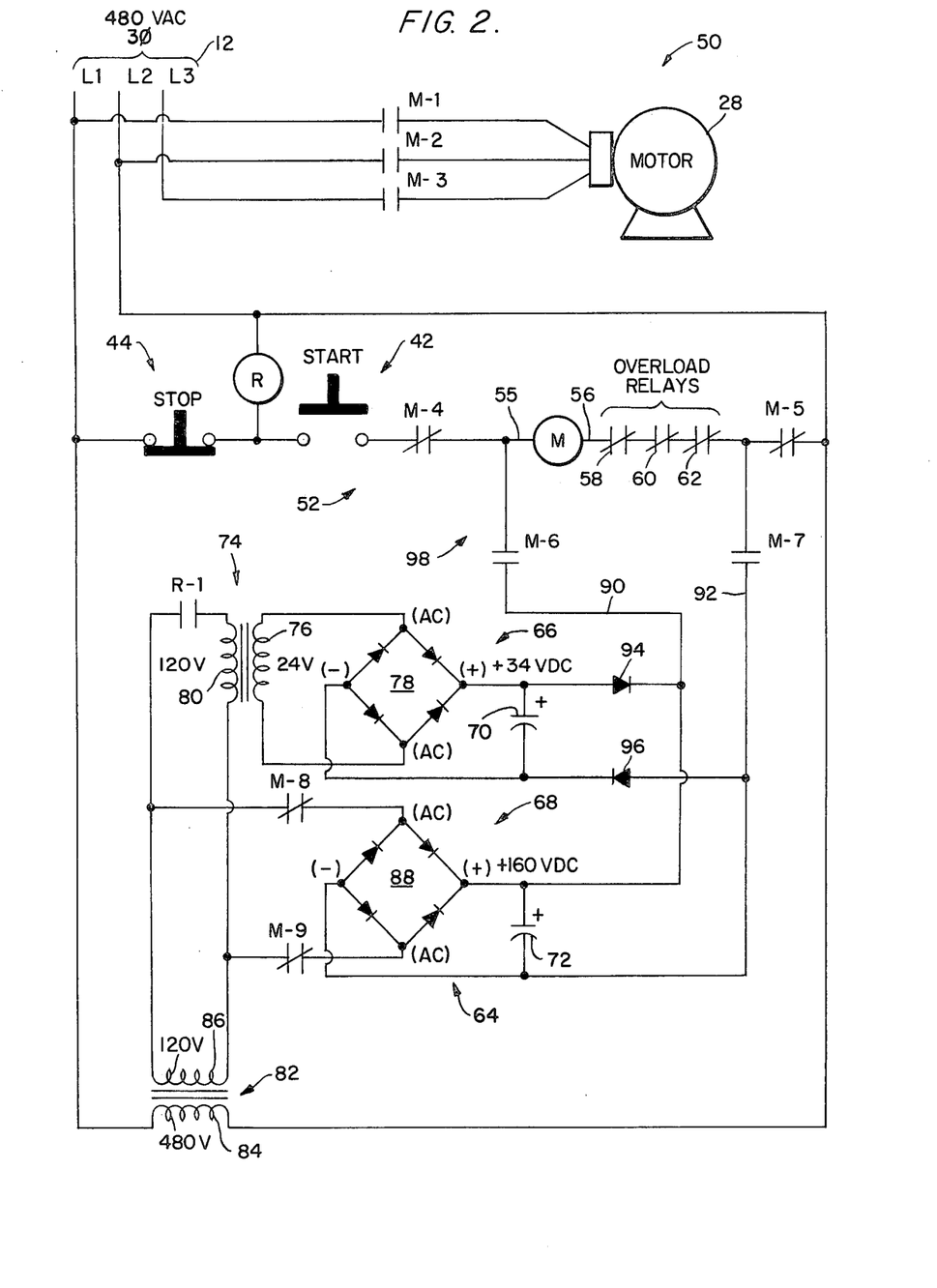
FIG. 2 is an electrical schematic diagram showing one embodiment of the invention.
Figure 4:
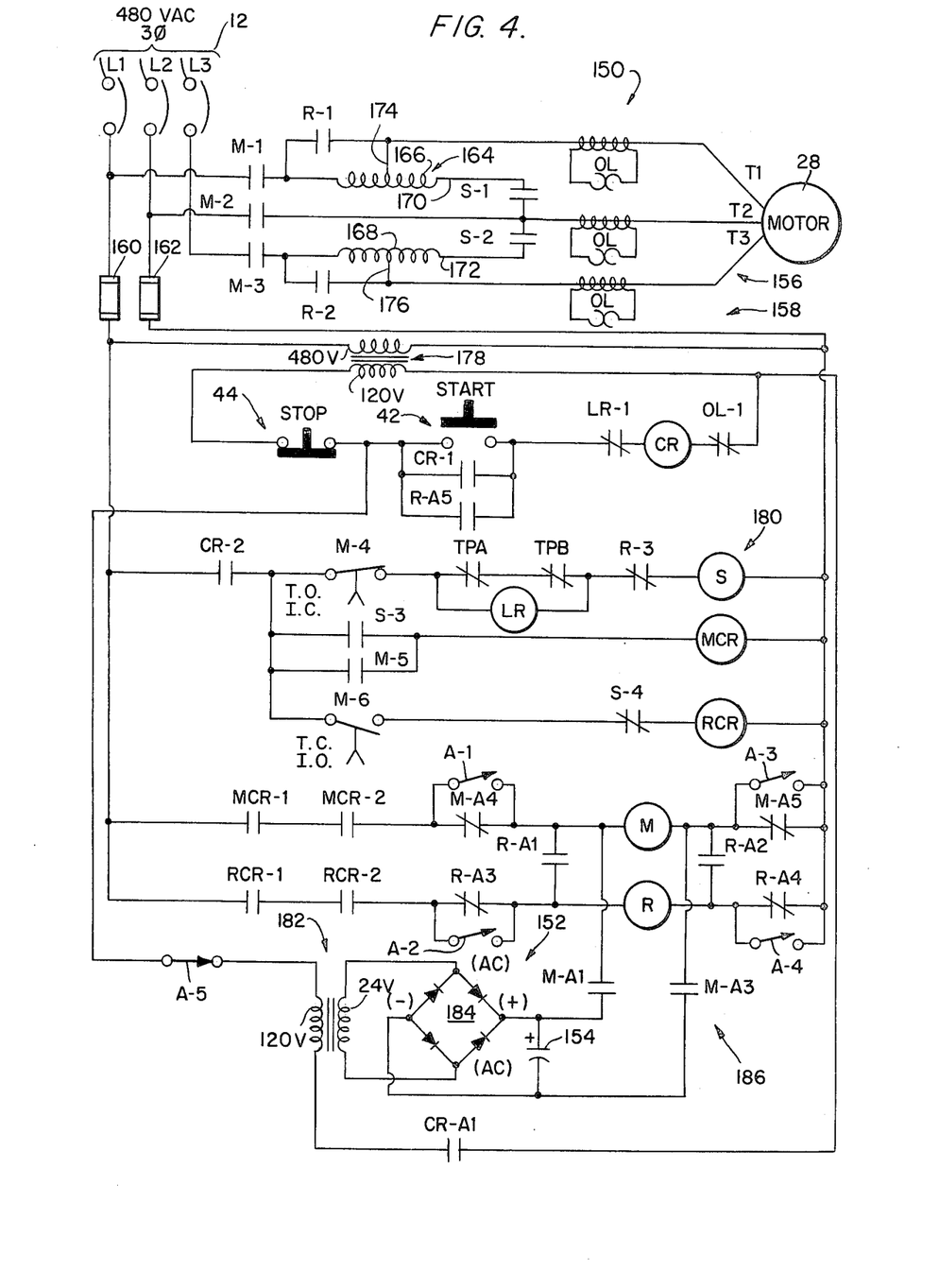
FIG. 4 is an electrical schematic diagram depicting another embodiment of the invention applied to a commercially-available three phase autotransformer reduced voltage motor starter.
Figure 5:
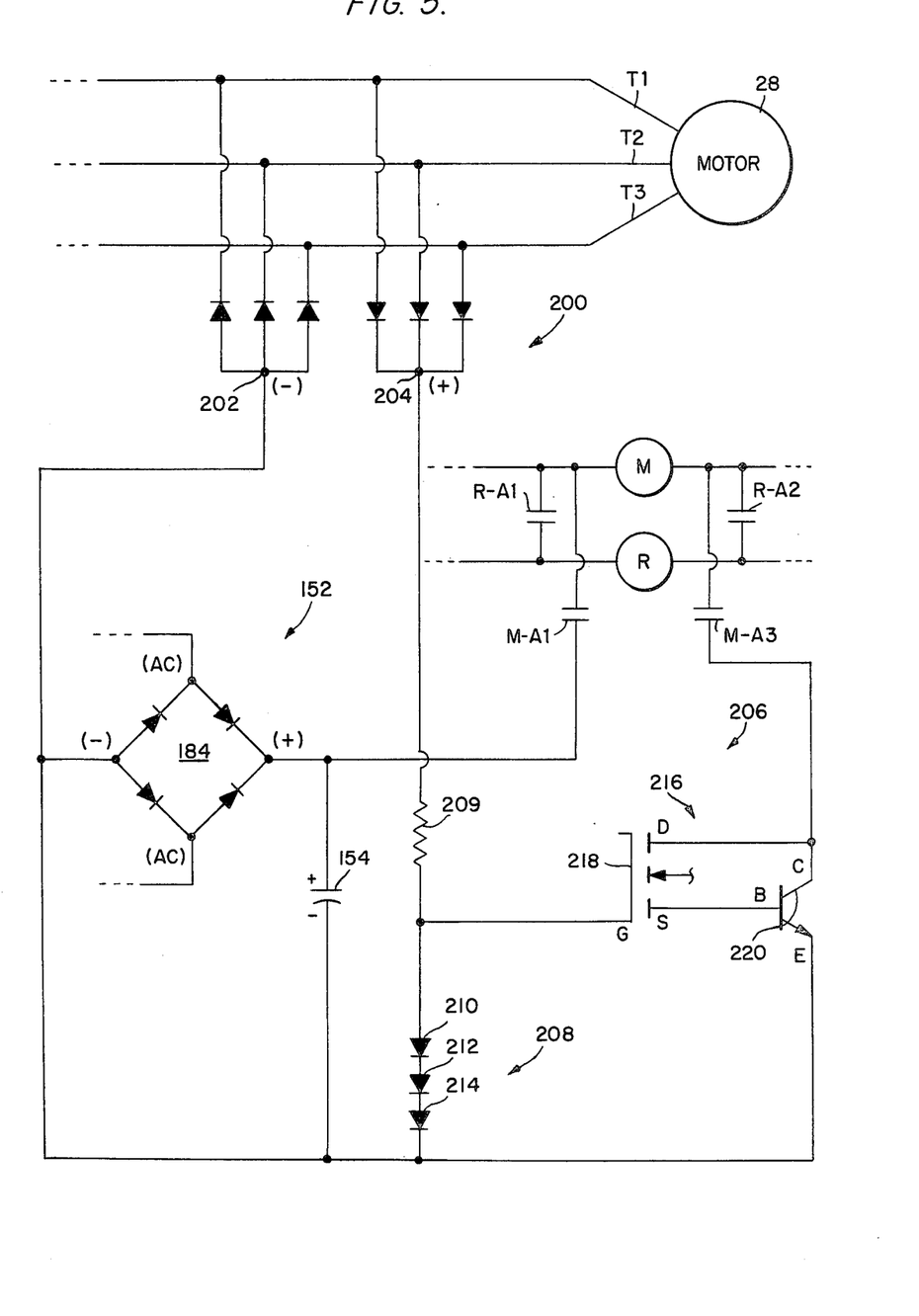
FIG. 5 is an electrical schematic diagram depicting a modification to the FIG. 4 embodiment which senses actual motor rotational velocity to determine when to permit starter relay drop out.

Three specific electrical circuits are described hereinbelow. The first, described with reference to FIG. 2, is intended to illustrate the general concepts of the invention. The second, described with reference to FIG. 4, is intended to illustrate the manner in which the present invention may be applied by way of modification or retrofit to a commercially-available AC reduced voltage motor starter. FIG. 5 illustrates a modification to FIG. 4 to incorporate rotational velocity sensing.

Referring now to FIG. 2, a first specific circuit 50 embodying the invention operates the motor 28 from a 480 volt three phase AC power source 12 comprising phase conductors L1, L2 and L3.

The basic starter circuit 50 is a relatively simple one, including only a single magnetic motor starter relay including an actuating coil M and a set of normally-open main contacts M-1, M-2 and M-3 connected for energizing the motor 28 from the power source 12. A starting circuit, generally designated 52, is provided for initially energizing the actuating coil M from the main power source 12 when the momentary Start pushbutton 42 is operated. In this particular starter, the energizing circuit for the starter relay coil M runs from phase conductor L1, through normally-closed contacts of the Stop switch 44, and through normally-closed auxiliary contacts M-4 of the starter relay to terminal 55 of the starter relay coil M. A return connection to phase conductor L2 is from terminal 56 of relay coil M, through three normally-closed overload relay contacts 58, 60 and 62, and through normally-closed auxiliary contacts M-5 of the starter relay. It may be noted that the normally-closed auxiliary contacts M-4 and M-5 are not part of the usual starting circuit, but rather are included as a specific part of the present invention as will be more apparent from the description hereinafter. The overload relay contacts 58, 60 and 62 are representative of conventional protection devices, as will be understood by those skilled in the art.

In accordance with the invention, the circuit 50 additionally includes a DC power supply, generally designated 64. The DC power supply 64 includes two sections, a relatively lower voltage section 66 and a relatively higher voltage section 68. Connected to the output of the lower voltage section 66 is a storage capacitor 70, for example 2000 mfd at 50 volts. Another storage capacitor 72 is connected to the output of the relatively higher voltage section 68. An exemplary value for the storage capacitor 72 is 500 mfd at 200 volts.

More particularly, the relatively lower voltage section 66 of the power supply 64 comprises a step down transformer 74 having a 24 volt AC secondary winding 76 connected through an exemplary full wave bridge rectifier 78 to provide a rectified DC output at (+) and (−) terminals. The primary winding 80 of the step down transformer 74 is suplied with suitable operating voltage derived from the main power source 12, for example 120 volts from an intermediate step down transformer 82 having a primary winding 84 connected across the phase conductors L1 and L2. The secondary winding 86 of the transformer 82 supplies, for example, 120 volts AC.

In order to provide a means for turning off the power supply 64 and thus the motor 28 when the momentary Stop switch 44 is operated, a coil R of a stop control relay is connected so as to be deenergized when the normally-closed Stop switch 44 contacts are opened, and a normally-open contact R-1 of the stop control relay is connected in series with the primary winding 80 of the step down transformer 74. In normal operation the stop control relay coil R is continuously energized, and the contacts R-1 are closed.

The relatively higher voltage power supply section 68 comprises a similar full wave bridge rectifier 88, the (+) and (−) output terminals of which supply the storage capacitor 72. The AC input terminals of the bridge rectifier 88 are supplied directly from the secondary winding 86 of the transformer 82 through normally-closed starter relay contacts M-8 and M-9, the function of which is hereinafter described.

The outputs of the two power supply 64 sections 66 and 68 are connected generally in parallel, and to a pair of DC supply conductors 90 and 92. In order to prevent voltage from the relatively higher power supply section 68 from feeding into the relatively lower voltage power supply section 66 when the relatively higher voltage power supply section 68 is energized, a pair of isolation diodes 94 and 96 are appropriately poled and connected in series between the power supply section 66 and the DC supply conductors 90 and 92. Thus, the voltage across the conductors 90 and 92 reflects the output of whichever of the power supply sections 66 or 68 has the higher voltage at any given time during operation.

In accordance with the invention, an auxiliary contact arrangement, generally designated 98, is provided. The auxiliary contact arrangement 98 is operable, following initial energization of the actuating coil M, to disconnect the actuating coil M from the main power source 12 and to connect the actuating coil M for energization from the storage capacitor 70 and the DC power supply 64, specifically the relatively lower voltage section 66, such that, upon subsequent momentary interruption of the main power source 12, energy stored in the storage capacitor 70 maintains the motor starter relay actuating coil M energized until restoration of the main power source. More specifically, in the illustrated embodiment, the auxiliary contact arrangement comprises the aforementioned normally-closed auxiliary contacts M-4 and M-5 of the motor starter relay, and, additionally normally-open auxiliary contacts M-6 and M-7 of the motor starter relay arranged to connect the actuating coil M to the DC power supply conductors 90 and 92, and thus to the storage capacitor 70 and the relatively lower voltage section 66 of the power supply 64. It will be appreciated that other contact arrangements, such as on an auxiliary relay, might equally well be employed.

Figure 3:
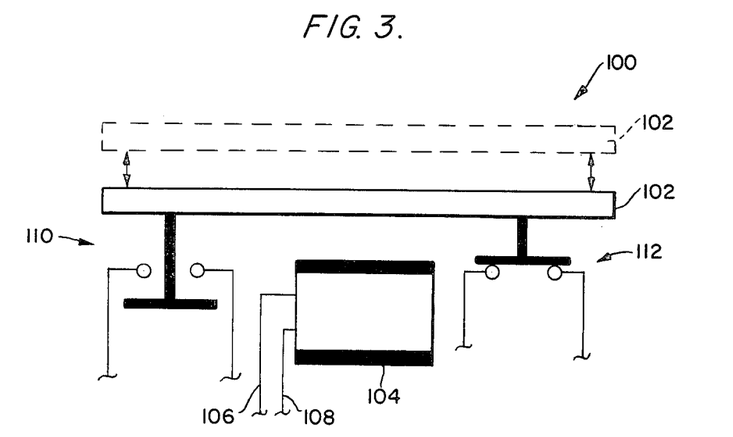
FIG. 3 is a highly schematic representation of a power relay such as is included in the circuit of FIG. 2.

It is believed that the operation of the FIG. 2 circuit 50 will be better understood in light of a brief description of the mechanical arrangement of a typical power relay, such as a representative relay 100 depicted schematically in FIG. 3. The FIG. 3 relay 100 includes a movable armature 102 and an actuating coil 104. When the coil is energized through conductors 106 and 108, magnetic force is produced by the coil 104 and pulls the armature 102 in a stroke from an unenergized position (depicted in dash lines) to an energized position (depicted in solid lines). The FIG. 3 relay 100 includes representative normally-closed contacts 110 and representative normally-open contacts 112 operated by the armature 102 and shown in the actuated position. It will be appreciated that the armature 102 can have significant mechanical inertia, particularly in relatively larger sized starter relays.

Referring now again to the circuit 50 of FIG. 2, in operation, upon actuation of the Start switch 42, the starter relay coil M is initially energized as described above. Magnetic force produced by the coil M begins pulling the relay armature towards the energized position. At an intermediate point of the actuating stroke, the normally-closed contacts M-4 and M-5 open, momentarily disconnecting the coil M from any source of energization. However, momentum of the armature continues to carry the armature towards the energized position and, at another intermediate point of the actuating stroke, only slightly behind the first intermediate point, the normally-open auxiliary contacts M-6 and M-7 close, connecting the relay coil M to the conductors 90 and 92 and thus to the output of the relatively lower voltage section 66 of the DC power supply 64.

The relay armature continues to the fully energized position. At this point, the main relay contacts M-1, M-2 and M-3 close, completing the energization path to the motor 28.

Upon momentary interruption of the 480 volt AC supply 12, the capacitor 70 discharges to momentarily maintain energization of the relay coil M, and to keep the main contacts M-1, M-2 and M-3 closed. The motor 28 thus remains on line such that, upon restoration of the AC power supply 12, the motor 28 is immediately reenergized.

If, however, the power outage is of a duration longer than that for which the rock crusher 10 (FIG. 1) can maintain sufficient momentum to resume normal operation upon restoration of the main power source, the capacitor 70 becomes discharged, allowing the start relay to drop out, opening the contacts M-1, M-2 and M-3.

To intentionally stop the rock crusher 10 in normal operation, the Stop switch 44 is actuated, deenergizing the relay coil R, which opens the contacts R-1 supplying the primary winding 80 of the relatively lower voltage supply section 66. As a result, the capacitor 70 discharges through the relay coil M, and, when sufficiently discharged, allows the relay coil M to open. To stop the rock crusher 10, the Stop switch 44 must be held operated for a longer period of time than the momentary power interruptions which the circuit 50 is designed to circumvent.

From the foregoing discussion, it will be appreciated that selection of proper voltages and time constants for the storage capacitor 70 is critical for proper operation of the circuit, and must be done in view of the characteristics of the particular starter relay involved. Inasmuch as the starter relay is designed for operation from an AC voltage, some routine experimentation is required to determine the DC operating characteristics of a particular model number starter relay.

In a typical rock crusher, operation can often be resumed following a momentary power interruption in the order of 0.8 second or less. Therefore, the component values, specifically the voltage of the power supply section 66 and the capacity of the storage capacitor 70 are selected to provide a delayed deenergization of the start relay for no longer than this 0.8 second. Otherwise, overloading of the rock crusher drive will result.

It will be appreciated that the particular drop out delay time provided by the circuit 50 is determined by conventional RC time constant considerations in view of the characteristics of the particular relay. To increase the period of time for which the relay coil M remains energized upon momentary interruption of the AC power supply 12, the DC supply 64 voltage can be increased or the capacitance of the storage cpacitor 70 increased. While the discharge time of the capacitor 70 in the circuit shown is limited by the DC resistance of the coil 10, the discharge time can be prolonged by inserting a fixed resistance (not shown) in series, affording an additional degree of control in the design of particular equipment. It will be appreciated that there are a number of limitations in the design parameters. For example, if the voltage is too high, then excessive current flows in the relay coil M, resulting in overheating. Additionally, there is a practical limit, due to physical size and expense, on the size of the storage capacitor 70.

In accordance with another aspect of the invention, it is recognized that, with some starter relays, particularly in the smaller sizes, upon opening of the auxiliary contacts M-4 and M-5 and closing of the auxiliary contacts M-6 and M-7, the coil M is insufficiently energized to ensure reliable full actuation, although coil current is sufficient to hold the starting relay in its energized position once energized. It is believed that this is more of a problem with the smaller sized starters than with the larger sized starters for the reason that the larger sized starter relays have correspondingly larger armatures, which, once initially energized, have greater momentum carrying the armature towards the fully energized position.

It is for this reason that the illustrated DC power supply 64 includes a relatively higher voltage section 68 for initially providing a relatively higher voltage to ensure actuation of the starter relay. Due to the normally-closed auxiliary contacts M-8 and M-9 in series with the AC input terminals of the bridge rectifier 88, the relatively higher power supply section 68 is deenergized upon actuation of the starter relay. As a result the relatively higher voltage is available only during the discharge time of the storage capacitor 72.

Thus, in operation with the relatively higher voltage power supply section 68 in the circuit, upon closure of the auxiliary contacts M-6 and M-7, 160 volts DC is momentarily applied to the relay coil M, ensuring actuation of the relay. The storage capacitor 72 then discharges down to the voltage provided by the relatively lower voltage power supply section 66, and the relatively lower power supply section 66 thereafter maintains energization of the relay coil M as described hereinabove.

Referring now to FIG. 4, there is illustrated the manner in which the present invention can be applied by way of modification or retrofit to a commercially-available AC reduced voltage three phase autotransformer starter 150. In the specific embodiment illustrated, the present invention is applied to a Cutler-Hammer model No. A400J three phase autotransformer starter, size 6, rated 400 horsepower at 480 volts. It will be appreciated, however, that the principles and concepts of the invention can be applied to a variety of other starters.

In FIG. 4, the majority of the components are those of the off-the-shelf Cutler-Hammer starter. The modification of the present invention adds several other components, specifically, a DC power supply 152 and a storage capacitor 154, a number of auxiliary relay contacts which can be identified by the inclusion of the letter "A" following the hyphen in the designation of the particular contact involved, and various ganged contacts A-1 through A-5 of a Normal/Automatic mode switch, all shown in the "Automatic" position. When the mode switch contacts A-1 through A-5 are in the Normal position, operation of the FIG. 4 starter is essentially identical to the starter in its off-the-shelf, unmodified condition. When the mode switch contacts A-1 through A-5 are in the Automatic position illustrated, operation in accordance with the present invention results.

Referring now in greater detail to FIG. 4, described next below are those components of the FIG. 4 starter 150 which comprise the off-the-shelf Cutler-Hammer reduced voltage starter, followed by a description of those components added in accordance with the present invention.

The starter 150 includes a high-current section 156 near the top of the schematic illustration, and a relatively low power control section 158 which is supplied through a pair of line voltage control fuses 160 and 162 from any two of the three phase conductors, for example L1 and L2.

For fully energizing the motor 28 during normal run operation, main contacts M-1, M-2 and M-3 of a Main relay are interposed in series between the three phase conductors L1, L2 and L3 and motor 28 terminals T1, T2 and T3. Additionally, the circuit to motor terminals T1 and T3 is completed through main contacts R-1 and R-2 of a Run relay.

In order to provide reduced voltage for starting the motor 28, an autotransformer 164 is provided, having two independent sections 166 and 168. For reduced voltage starting operation, main contacts S-1 and S-2 of a Start relay are closed, completing the connection of the lower ends 170 and 172 of the autotransformer sections 166 and 168, thus enabling the autotransformer 164 to supply reduced voltage to the motor 28. For reduced voltage operation, the main contacts R-1 and R-2 of the Run relay are open, the motor terminals T1 and T3 are supplied from autotransformer 164 tap points 174 and 176, and the motor terminal T2 is supplied directly from the phase conductor L2. In the normal sequence of operation, Start relay contacts S-1 and S-2 are initially closed to condition the autotransformer 164 for supplying reduced voltage. The Main relay contacts M-1, M-2 and M-3 are then closed to energize the autotransformer 164. After an appropriate period of time to allow motor rotation to commence, for example, 20 seconds, the Start relay contacts S-1 and S-2 open, and the Run relay contacts R-1 and R-2 close to supply full line voltage to the motor 28.

The control section 158 of the FIG. 3 starter 158 functions to properly sequence the various relay contacts of the high-current section 156.

The control section 158 includes a number of relay coils. The first of these is a Control Relay coil CR, preferably operated at a reduced voltage, i.e., 120 volts AC, supplied by a step down transformer 178 in order to allow the Stop 44 and Start 42 momentary pushbutton switches to be remotely located without requiring high voltage control wiring to the remote control stations, such as the station 40 of FIG. 1. The Control Relay coil CR is energized whenever the Start switch 42 is operated. In a conventional holding circuit arrangement, the Control Relay has latch-on contacts CR-1 bypassing the Start switch 42 to maintain the Control Relay coil CR energized during normal operation. Various thermal and current overload protection arrangements are included within the motor starter 150 and, for this purpose, normally-closed contacts LR-1 and OL-1 are connected in series with the Control Relay coil CR. During normal operation contacts LR-1 and OL-1 remain closed. Contact LR-1 opens if either of two thermal protector contacts TPA and TPB open, energizing relay coil LR (which must be manually reset to resume normal operation). Contacts OL-1 open in the event of a current overload sensed by either of three current transformers in the three phase windings supplying motor 28 in the high-current section 156.

The Contol Relay has a set of normally-open control contacts CR-2 which are connected to energize a start sequencing relay arrangement, generally designated 180, from 480 volt line voltage whenever the Control Relay is actuated. The control contacts CR-2 supply the Start relay coil S through normally-closed Main relay contacts M-4, the normally-closed contacts M-4 having a timed open (T.O.), instantaneous close (I.C.) characteristic. In order to ensure that the Start relay contacts S-1 and S-2 cannot be closed while the Run relay is actuated and its contacts R-1 and R-2 are closed, a normally-closed contact R-3 of the Run relay is connected in series with the Start relay coil S.

Also energized through the control contacts CR-2 is the coil MCR of a Main Control Relay, which functions as a pilot relay for the Main relay. The Main Control Relay coil MCR is energized initially through normally-open Start relay contacts S-3 upon actuation of the the Start relay, and energization of the Main Control Relay coil MCR is subsequently maintained when the Main relay normally-open contacts M-5 close.

Finally, supplied through the control contacts CR-2 is a Run Control Relay coil RCR, which operates as a pilot relay for the Run relay. Run Control Relay coil RCR is supplied through Main relay normally-open contacts M-6, which have a timed closed (T.C.), instantaneous open (I.O.) characteristic. To ensure that the Run Control Relay coil RCR and thus the Run relay cannot be operated while the Start relay is still actuated, normally-closed Start relay contacts S-4 are connected in series with the Run Control Relay coil RCR.

Completing the off-the-shelf portion of the FIG. 4 starter 150 are the energizing paths for the Main and Run relay coils M and R. In the standard (unmodified) version of the Cutler-Hammer circuit, the only contacts involved are series-connected redundant Main Control Relay normally-open contacts MCR-1 and MCR-2 supplying the Main relay coil M, and series-connected redundant normally-open Run Control Relay contacts RCR-1 and RCR-2 supplying the Run relay coil R. The other relay contacts depicted are not present in the unmodified circuit. During "Normal" mode operation of the modified circuit of the present invention, contacts A-1, A-2, A-3 and A-4 of the Normal/Automatic selector switch are all closed, bypassing relay contacts M-A4, R-A3, M-A5 and R-A4.

Before proceeding with a description of the modifications of the present invention, the normal (unmodified) operation of the starter 150 of FIG. 4 will now be described. Initially, the Start switch 42 energizes the Control Relay Coil CR, and contacts CR-1 bypass the Start switch 42, causing the Control Relay to latch on. At this point, the control contacts CR-2 close, energizing the start sequencing arrangement 180. In the sequence, the Start relay coil S is immediately energized, causing start contacts S-1 and S-2 to close, conditioning the autotransformer 162 to supply reduced voltage. At the same time, Start relay contacts S-3 close, energizing the Main Control Relay coil MCR. Contacts MCR-1 and MCR-2 close, energizing the Main relay coil M, closing the Main contacts M-1, M-2 and M-3. At this point, the motor 28 is energized at reduced voltage through the autotransformer 164. After a brief time delay, for example 20 seconds, normally-closed Main relay contacts M-4 open, deenergizing the Start relay coil S, causing the contacts S-1 and S-2 to open. Nearly simultaneously, normally-open Main relay contacts M-6 close, energizing the Run Control Relay coil RCR, which in turn closes contacts RCR-1 and RCR-2 to energize the Run relay coil R. Run relay contacts R-1 and R-2 then close, energizing the motor 28 from full AC line voltage. The opening of contacts M-4 and the closing of contacts M-6 occurs nearly simultaneously. Due to the interlock afforded by the connection of the normally-closed Run relay contacts R-3 in series with the Start relay coil S, and the connection of the normally-closed Start relay contacts S-4 in series with the Run Control Relay coil RCR, the precise order of the contact M-4 opening and the contact M-6 closing is immaterial. In no event can the Run relay contacts R-1 and R-2 close before the Start relay contacts S-1 and S-2 open.

For a normal intended stop, operation of the momentary Stop switch 44 breaks the energizing circuit to the Control Relay coil CR. Contact CR-2 opens, deenergizing the Main Control Relay coil MCR and the Run Control Relay coil RCR, in turn deenergizing the Main and Run relay coils M and R.

The additions to the standard (unmodified) circuit 150 of FIG. 4 in accordance with the present invention are relatively few, and can be readily implemented, either in the field by way of retrofit, or as a modification to the off-the-shelf equipment upon initial installation. In this regard, it will be appreciated that one of the aspects of the present invention is the ease with which it may be implemented.

In accordance with the invention, the storage capacitor 154 and the DC power supply 152 connected for charging the storage capacitor 154 and maintaining the charge when the AC power source 12 is available are included. The power supply 152 more particularly comprises a step down transformer 182 followed by a conventional full wave rectifier bridge 184 in the same manner as described hereinabove with reference to FIG. 2. An auxiliary contact arrangement 186 in accordance with the invention comprises normally-closed Main relay contacts M-A4 and M-A5, and normally-closed Run relay contacts R-A3 and R-A4 connected to deenergize the respective actuating coils M and R from the AC supply 12 when the Main and Run relays are actuated. To supply the Main relay coil M from the storage capacitor 154 and power supply 152, normally-open Main relay contacts M-A1 and M-A3 are connected between the power supply 152 to output and the Main relay coil M. Normally-open Run relay contacts R-A1 and R-A2 similarly energize the Run relay coil R from the DC power supply 152 and storage capacitor 154 when the Run relay is actuated. In this regard, it should be noted that the Main relay is always energized before the Run relay, and thus DC power is available to the Run relay coil R whenever the contacts R-A1 and R-A2 close.

Thus, upon subsequent momentary interruption of the AC power source, energy stored in the capacitor 154 maintains the Main relay coil M and the Run relay coil R energized until restoration of the main AC power source in the same manner as described above with reference to FIG. 2.

In the particular circuit illustrated in FIG. 4, the only relays which are energized from the storage capacitor 154 upon power interruption are the Main relay and the Run relay. The coils of the Control relay, the Main Control Relay and the Run Control Relay are all deenergized. In order to immediately reenergize these relay coils upon restoration of main AC power, auxiliary contacts R-A5 of the Run relay also bypass the Start switch 42. These auxiliary contacts R-A5 remain closed during such momentary power outages, ensuring that Control relay coil CR is immediately reenergized upon restoration of power.

In order to provide a means for stopping operation of the FIG. 4 starter 150 when operating in the automatic mode, a contact CR-A1 of the Control Relay is connected in series with the primary winding of the DC power supply transformer 182. Upon actuation of the Stop switch 44 during automatic operation, the Control Relay coil CR is deenergized, opening the contacts CR-A1. After an approximately 0.8 second time delay while the storage capacitor 154 discharges to the Main and Run relays M and R, the Main and Run relays drop off, deenergizing the motor 28.

Referring finally to FIG. 5, there is illustrated a modification to FIG. 4 wherein motor rotational velocity is sensed and employed as the determining factor for when to drop off the main relay coil M and the Run relay coil R, rather than merely relying upon an RC time constant. In FIG. 5, the storage capacitor 154 is employed as before, but the storage capacitor 154 has a higher capacitance than before so as to maintain energization to the relay coils M and R so long as the motor 28 is rotating with sufficient velocity, as separately sensed.

In FIG. 5, a means 200 is operable at least upon interruption of the main power source for sensing motor rotational velocity. In FIG. 5, this means 200 comprises a full-wave bridge rectifier 200, more particularly, a full-wave three-phase bridge rectifier having (−) and (+) output terminals 202 and 204. A controlled switching element, generally designated 206, is connected to the capacitor 154 and to the actuating coils M and R to de-energize actuating coils M and R when motor 28 rotational velocity decreases below a predetermined velocity. More particularly, the controlled switching element 206 is connected in series between the (−) terminal of the capacitor 154 and the relay contact M-A3 supplying the main relay coil M.

The controlled switching element 206 comprises a voltage threshold conduction device, generally designated 208, and a resistance 209 connected in series between the full-wave rectifier 200 output terminals 202 and 204. In the particular embodiment illustrated, the voltage threshold conducting device 208 comprises three forward-biased silicon diodes 210, 212 and 214 operating as a voltage regulator. It will be appreciated, however, that other forms of voltage threshold conduction device 208 may be employed, such as a Zener diode. For a bridge rectifier 200 output voltage ranging up to 700 volts, the resistance 209 has an exemplary value of 100K ohms.

The controlled switching element 206 further comprises a solid state switching device 216 having a relatively high input impedance connected so as to be responsive to voltage across the voltage threshold conduction device 208, and the output of the solid state switching device 216 is connected in series between the storage capacitor 154 and the relay coil M. In the illustrated embodiment, the solid state switching device comprises an N-channel enhancement mode MOSFET 218 connected to an NPN bipolar transistor output element 220.

In the operation of the FIG. 5 modified circuit, upon interruption of AC power, sufficient voltage is induced by the motor 28, while it is still rotating, and applied through the rectifier 200 across the resistance 210 and threshold conducting device 208. Voltage across the threshold conduction device 208 biases the MOSFET 218 and the bipolar transistor 220 into conduction, completing the circuit to the Main relay coil M.

When motor 28 rotational velocity drops below a predetermined velocity, the voltage across the threshold conducting device 208 is insufficient to maintain the MOSFET 218 and bipolar transistor in conduction, and the Main and Run relay coils M and R are de-energized.

Significantly, with three-wave rectification provided by the rectifier 200, the rectified phases overlap such that the rectifier 200 output voltage never drops to zero while the motor 28 is rotating, as would be the case with a single-phase rectifier. Accordingly, no filter capacitor is required at the rectifier 200 output terminals 202 and 204 which, if present, would introduce a time delay degrading the response speed of the circuit.

While specific embodiments of the invention have been illustrated and described herein, it is realized that numerous modifications and changes will occur to those skilled in the art. It is therefore to be understood that the appended claims are intended to cover all such modifications and changes as fall within the true spirit and scope of the invention.

What is claimed is:

1. A motor control circuit for operating a motor driving a load which cannot be started under load but which maintains sufficient momentum to resume normal operation upon restoration following momentary interruption of a main power source, said circuit serving to prevent motor starter relay drop out during such momentary interruptions, and said circuit comprising:
   a magnetic motor starter relay including an actuating coil and a set of normally-open main contacts connected for energizing the motor from the main power source;
   a starting circuit for initially energizing said actuating coil from the main power source;
   a storage capacitor and a DC power supply connected for charging said storage capacitor and maintaining the charge when the main power source is available;
   an auxiliary contact arrangement operable following initial energization of said actuating coil to disconnect said actuating coil from the main power source and to connect said actuating coil for energization from said storage capacitor and said DC power supply such that, upon subsequent momentary interruption of the main power source, energy stored in said capacitor maintains said actuating coil of said motor starter relay energized until restoration of the main power source; and
   said DC power supply being arranged to initially provide a relatively higher voltage to ensure actuation of said motor starter relay and, subsequent to full actuation of said motor starter relay, to provide a relatively lower voltage at least sufficient to hold said motor starter relay in an actuated condition.

2. A motor control circuit for operating a motor driving a load which cannot be started under load but which maintains sufficient momentum to resume normal operation upon restoration following momentary interruption of a main power source, said circuit serving to prevent motor starter relay drop out during such momentary interruptions, and said circuit comprising:
   a magnetic motor starter relay including an actuating coil, a set of normally-open main contacts connected for energizing the motor from the main power source, and a movable armature pulled by magnetic force produced by said actuating coil in a stroke from an unenergized to an energized position for actuating the relay contacts;
   a starting circuit for initially energizing said actuating coil from the main power source;
   a storage capacitor and a DC power supply connected for charging said storage capacitor and maintaining the charge when the main power source is available;
   an auxiliary contact arrangement operable following initial energization of said actuating coil to disconnect said actuating coil from the main power source at an intermediate point of the actuating stroke and to then connect said actuating coil for energization from said storage capacitor and said DC power supply as momentum of said armature carries said armature through another intermediate point of the actuating stroke such that, upon subsequent momentary interruption of the main power source, energy stored in said capacitor maintains said actuation coil of said motor starter relay energized until restoration of the main power source; and
   said DC power supply being arranged to initially provide a relatively higher voltage to ensure sufficient magnetic force to carry the armature from said other intermediate point of the actuating stroke to the energized position, and, subsequent to full actuation of said motor starter relay, to provide a relatively lower voltage at least sufficient to hold the armature in the energized position.

3. A motor control circuit for operating a motor driving a load which cannot be started under load but which maintains sufficient momentum to resume normal operation upon restoration following momentary interruption of a main power source, said circuit serving to prevent motor starter relay drop out during such momentary interruptions, and said circuit comprising:
   a magnetic motor starter relay including an actuating coil and a set of normally-open main contacts connected for energizing the motor from the main power source;
   a starting circuit for initially energizing said actuating coil from the main power source;
   a storage capacitor and a DC power supply connected for charging said storage capacitor and maintaining the charge when the main power source is available;
   an auxiliary contact arrangement operable following initial energization of said actuating coil to disconnect said actuating coil from the main power source and to connect said actuating coil for energization from said storage capacitor and said DC power supply such that, upon subsequent momentary interruption of the main power source, energy stored in said capacitor maintains said actuating coil of said motor starter relay energized until restoration of the main power source;
   means operable at least upon interruption of the main power source for sensing motor rotational velocity; and
   a controlled switching element connected to said capacitor and to said actuating coil to de-energize said actuating coil when motor rotational velocity decreases below a predetermined velocity.

4. A motor control circuit in accordance with claim 3, wherein said velocity sensing means comprises a full-wave rectifier connected to energization terminals of the motor, said full wave rectifier having a pair of output terminals.

5. A motor control circuit in accordance with claim 4, wherein said full-wave rectifier is a three-phase full-wave rectifier.

6. A motor control circuit in accordance with claim 4, wherein said controlled switching element comprises:
   a voltage threshold conduction device and a resistance connected in series between said full wave rectifier output terminals;

a solid state switching device having a relatively high input impedance, the input of said solid state switching device connected so as to be responsive to voltage across said voltage threshold conduction device, and the output of said solid state switching device connected in series between said storage capacitor and said actuating coil.

7. A motor control circuit in accordance with claim 6, wherein said solid state switching device comprises a MOSFET input element connected to a bipolar transistor output element.

8. In a reduced motor starter operable from an AC power source for operating a motor driving a load which cannot be started under load but which maintains sufficient momentum to resume normal operation upon restoration following momentary interruption of the AC power source, and of the type including a transformer for reducing voltage applied to the motor; a control relay having an actuating coil energized from the AC power source through a momentary start switch, having latch-on contacts bypassing the start switch to maintain the control relay actuating coil in an energized condition during normal operation, and having a set of normally-open control contacts; and a start sequencing relay arrangement energized initially and having contacts arranged to momentarily condition the transformer for supplying reduced voltage to the motor, a main relay having an actuating coil energized next and having contacts arranged for connection of the transformer to the AC power source, and a run relay having an actuating coil energized finally and having contacts arranged for connecting the motor directly to the AC power source through the main relay contacts after the start relay is no longer energized; a circuit for preventing drop out of the main relay and the run relay during momentary interruptions of the AC power source during which the motor and load maintain sufficient momentum to resume normal operation upon restoration of the AC power source, said circuit comprising:

a storage capacitor and a DC power supply connected for charging said storage capacitor and maintaining the charge when the AC power source is available;

a main relay auxiliary contact arrangement operable following initial energization of the main relay to disconnect the main relay actuating coil from the AC power source and to connect the main relay actuating coil for energization from said storage capacitor and said DC power supply, and run relay auxiliary contact arrangement operable following initial energization of the run relay to disconnect the run relay actuating coil from the AC power source and to connect the run relay actuating coil for energization from said storage capacitor and said DC power supply, such that, upon subsequent momentary interruption of the AC power source, energy stored in said capacitor maintains the actuating coils of the main relay and the run relay energized until restoration of the AC power source;

means operable at least upon interruption of the main power source for sensing motor rotational velocity; and a controlled switching element connected to said capacitor and to said main and run relay actuating coils and controlled by said velocity sensing means to de-energize said actuating coils when motor rotational velocity decreases below a predetermined velocity.

9. A motor control circuit in accordance with claim 8, wherein said velocity sensing means comprises a full-wave rectifier connected to energization terminals of the motor, said full-wave rectifier having a pair of output terminals.

10. A motor control circuit in accordance with claim 9, wherein said full-wave rectifier is a three-phase full-wave rectifier.

11. A motor control circuit in accordance with claim 9, wherein said controlled switching element comprises:

a voltage threshold conduction device and a resistance connected in series between said full-wave rectifier output terminals;

a solid state switching device having a relatively high input impedance, the input of said solid state switching device connected so as to be responsive to voltage across said voltage threshold conduction device, and the output of said solid state switching device connected in series between said storage capacitor and said actuating coils.

12. A motor control circuit in accordance with claim 11, wherein said solid state switching device comprises a MOSFET input element connected to a bipolar transistor output element. F

* * * * *